United States Patent [19]

Li et al.

[11] Patent Number: 5,185,301

[45] Date of Patent: * Feb. 9, 1993

[54] SINTER REACTIVE LANTHANUM CHROMITE AND PROCESS FOR MAKING IT

[75] Inventors: Beili Li, Morristown; Stephen Haig, Highland Park; Jean Yamanis, Morristown, all of N.J.

[73] Assignee: Allied-Signal Inc., Morristownship, N.J.

[ * ] Notice: The portion of the term of this patent subsequent to Dec. 8, 2009 has been disclaimed.

[21] Appl. No.: 826,194

[22] Filed: Jan. 21, 1992

Related U.S. Application Data

[63] Continuation of Ser. No. 511,708, Apr. 20, 1990, abandoned.

[51] Int. Cl.$^5$ .................. C04B 35/04; C04B 35/51; C04B 35/42; C01G 39/00
[52] U.S. Cl. ................................. 501/117; 501/126; 501/108; 501/152; 252/518; 252/521; 423/263; 423/593; 423/606; 264/82; 264/83
[58] Field of Search .................. 501/12, 103, 152, 153, 501/94, 108, 107, 128; 423/263, 593, 606; 252/518, 521; 264/83, 82

[56] References Cited

U.S. PATENT DOCUMENTS 4,830,780  5/1989  Olson et al. .................. 252/521
4,845,056  7/1989  Yamanis .................. 501/12

Primary Examiner—Mark I. Bell
Assistant Examiner—Michael Marcheschi
Attorney, Agent, or Firm—Ernest D. Buff; Gerhard H. Fuchs

[57] ABSTRACT

A sinter-reactive lanthanum chromite powder is prepared from the lanthanum chromite precursor $LaCr_{1-x}M_xO_3$ (Adsorbate). The powder is crystalline, has the formula $LaCr_{1-x}M_xO_3$, where M is magnesium or calcium and x ranges from about 0.03 to 0.3, and sinters to densities higher than about 95% of theoretical density at temperature as low as 1600° C. in inert or reducing atmospheres. Sintering to such high density at temperatures in the vicinity of 1600° C. makes the powder particularly suited for use as interconnect material for solid oxide fuel cells.

5 Claims, 3 Drawing Sheets

SINTER REACTIVE LANTHANUM CHROMITE AND PROCESS FOR MAKING IT

This application is a continuation of application Ser. No. 511,708 filed Apr. 20, 1990 now abandoned.

BACKGROUND OF THE INVENTION

Solid oxide fuel cells (SOFC) have high potential in producing electrical energy from cheap fuels or by-product waste gas streams of the petrochemical and metallurgical industries. The potential of these fuel cells lies in the high efficiency of converting chemical to electrical energy and could find extensive applications in the domestic, commercial, defense, and aerospace sectors of the economy. The realization of this potential is contingent on the development of reliable and cost efficient methods of cell fabrication.

One of the solid oxide fuel cell designs resembles a heat exchanger with a honeycomb structure in which the electroactive ceramic components also serve as the structural members and eliminate the need for inert supports. This design is referred to as the monolithic solid oxide fuel cell (MSOFC). The honeycomb structure the MSOFC is made up of thin layers of four components: (1) anode usually made of a nickel-zirconia cermet; (2) electrolyte made of a fully stabilized (cubic) zirconia; (3) cathode made of strontium- doped lanthanum manganite ($LaMnO_3$); and, (4) interconnect made of doped lanthanum chromite ($LaCrO_3$). The anode, electrolyte, and cathode layers make up a cell while the interconnect serves as an internal electrical connection between individual cells.

The monolithic solid oxide fuel cell offers lower material costs, the potential for reduced manufacturing costs, and a higher efficiency over other geometries and designs. However, fabrication of these cells is complicated because the individual components in thin sheet form must be formed into multilayer sheets which are then converted into a honeycomb structure and must be cosintered at the same relatively low temperature. Of particular importance is the sintering behavior of the interconnect material, that is, lanthanum chromite which must be sintered to close porosity or about 94% of its theoretical density.

Lanthanum chromite is a refractory material with a melting point of 2510° C which requires very high temperatures and controlled atmospheres, i.e. extremely low partial pressures of oxygen for sintering to near theoretical density. Groupp and Anderson (L. Groupp and H. U. Anderson, J. Am. Ceram. Soc., 59, 449 (1976)) have shown that $LaCrO_3$ does not sinter in air even at temperatures as high as 1720° C. According to the data reported by these investigators, $LaCrO_3$ could be sintered to 95.3% TD only at 1740° C. and in an atmosphere of nitrogen having an oxygen partial pressure of $10^{-11}$ atm. The main inhibition to densification appears to be the volatilization of chromium oxides in oxidizing atmospheres. The oxidation and volatilization of lanthanum chromite in oxidizing atmospheres at temperatures higher than 1400° C. has indeed been reported by Meadowcroft and Wimmer (75th Annual Meeting of the Am. Ceram. Soc., Cincinnati, (1973) and D. B. Meadowcroft and J. M. Wimmer, Am. Ceram. Soc. Bull., 58, 610 (1979)) and involves the oxidation of Cr(III) to Cr(VI) and formation of fugitive $CrO_3$ which is a gas at the high temperatures of sintering. Therefore, the preparation of lanthanum chromite powders which sinter to close porosity at temperatures below 1650° C. so that Cr volatilization is minimized is critical for the development of fuel cell fabrication technology. One method of fabricating lanthanum chromite ($LaCrO_3$) electrodes is disclosed in U.S. Pat. No. 3,974,108. This patent teaches the preparation of strontium-doped $LaCrO_3$ from lanthanum oxide, strontium carbonate and chromic acid by slurry mixing these materials, drying the slurry and then firing the dried powder mixture in air at temperatures in the preferred range of 1200° to 1500° C. The resultant fired powder is strontium-doped $LaCrO_3$ which sinters only at temperatures in excess of 1700° C.

An alternative approach is to use sol-gel technology to prepare high surface area, i.e. very fine grain, and sinter reactive $LaCrO_3$ powders which sinter to full density at temperatures considerably lower than 1700° C. Reduction in sintering temperature is achieved by controlling the composition, homogeneity, grain size, and morphology of the powder. This control is brought about by solution chemistry and improved powder separation and processing technology. One such method for preparing lanthanum chromite has been disclosed by C. N. Rao et al. "Synthesis of Complex Metal Oxides Using Hydroxide, Cyanide and Nitrate Solid Solution Precursors", Journal of Solid State Chemistry, vol. 58, 29-37 (1985). This method consists of coprecipitation of lanthanum and chromium hydroxides which are intimately mixed and essentially constitute a solid solution of $LaCr(OH)_6$. This hydroxide solid solution is converted to $LaCrO_3$ by calcination at 850° C. for 12 hours.

Specifically, Rao et al. teach the coprecipitation of $LaCr(OH)_6$ by adding an aqueous nitrate solution of metal ions to a sodium hydroxide solution with subsequent extensive washing of the resultant hydroxide gel to remove sodium ions. Removal of sodium ions from the gel is required because even a very low concentration of sodium ion markedly changes the properties of the gel and degrades the properties of the resultant lanthanum chromite powder. Moreover, Rao et al. state that ammonium hydroxide base could not be used to coprecipitate a hydroxide containing a divalent metal such as magnesium or strontium which are frequently used as dopants of lanthanum chromite. In contrast to the teachings of Rao et al., an improved sol- gel method has been disclosed by U.S. Pat. No. 4,830,780, to Olson et al., for the preparation of lanthanum chromite doped with the divalent ions of magnesium, strontium, calcium or barium by coprecipitation from salt solutions of lanthanum, chromium and dopant ions with ammonium hydroxide. With the Olson et al. process, extensive washing of the precipitated gel is not needed because residual ammonium ion is removed via the gas phase during powder calcination. Upon calcination at temperatures of about 600° C., the gel converts to a single compound with the huttonite structure, $LaCrO_4$, which upon further calcination at 900° C. converts to pure lanthanum chromite, $LaCrO_3$, with average particle size of about 0.5 μm. The single phase composition of this powder and its fine grain size are in sharp contrast with the powder which is derived by following the teachings of Rao et al. The lanthanum chromite powder prepared according to the Olson et al. process could be sintered to 95.7% theoretical density at 1650° C. for 4 hours in a graphite furnace and to 78% theoretical density at 1600° C. for 2 hours in a furnace with oxygen partial pressure of $10^{-10}$ atmospheres. Densification of this lanthanum chromite to the indicated densities was much better than that achievable by process of the type taught by Group and Anderson.

SUMMARY OF THE INVENTION

This invention provides a method (1) for preparation of a precursor of lanthanum chromite powder, (2) for preparation of sinter-reactive lanthanum chromite powder, and (3) for preparation of both the precursor and the sinter-reactive lanthanum chromite powders.

In one embodiment, the present invention comprises a lanthanum chromite precursor powder which is amorphous or microcrystalline and has the empirical formula $LaCr_{1-x}M_xO_3$ (Adsorbate) where M is a divalent metal such as magnesium or calcium, x is in the range of 0.03 to 0.3, and Adsorbate is volatile matter which is adsorbed on the powder. The composition of the Adsorbate consists essentially of water, alcohols and other organic adducts. The amount of the Adsorbate may be up to about 35 weight percent of the total as-produced lanthanum chromite precursor.

In another embodiment, the invention provides a process for the preparation of a lanthanum chromite precursor having the empirical formula $LaCr_{1-x}M_xO_3$ (Adsorbate) where M is a divalent metal such as magnesium or calcium, x is in the range of 0.03 to 0.3, and Adsorbate is volatile matter which is adsorbed on the powder and which may be up to 35 weight percent of the precursor, the process comprising the steps of:

(a) reacting a solution containing a lanthanum compound and a chromium compound in an atomic ratio of La:Cr of 1:1-x with a stoichiometric excess of ammonium hydroxide to precipitate an intermediate hydroxide in the form of a slurry;

(b) washing the precipitated intermediate hydroxide with deionized (DI) water or DI water/alcohol mixtures to remove most of the anions from the lanthanum and chromium compounds used in step (a) and to yield a slurry in a water/alcohol liquid;

(c) adding to the hydroxide slurry obtained in step (b) a solution of an M compound in a quantity sufficient to yield an atomic ratio of La:Cr:M of 1:1-x:x where M is a divalent metal such as magnesium, and is operative as a dopant, (d) separating the powder from the water/alcohol liquid at supercritical conditions, (i.e., at temperature and pressure equal to or greater than the critical point of the water/alcohol liquid in a batch or continuous process) to obtain precursor lanthanum chromite powder with empirical formula $LaCr_{1-x}M_xO_3$ (Adsorbate)

In still another embodiment of the invention, a sinter-reactive lanthanum chromite powder is prepared from the lanthanum chromite precursor $LaCr_{1-x}M_xO_3$ (Adsorbate). This sinter-reactive lanthanum chromite powder is crystalline, has the formula $LaCr_{1-x}M_xO_3$, where M is magnesium or calcium and x ranges from about 0.03 to 0.3, and sinters to densities higher than about 95% of theoretical density at temperatures as low as 1600° C. in inert or reducing atmospheres.

Yet another embodiment of the invention comprises a process for preparing the sinter-reactive lanthanum chromite from the precursor lanthanum chromite powder obtained via the process defined in steps (a) through (d) by calcining in air at a temperature ranging from 650 to 1100° C. for 0.5 to 5 hrs. and by deagglomerating the calcined powder using a suitable size-reduction process such as ball-milling, attrition milling, etc. $LaCr_{1-x}M_xO_3$ is referred to herein as M-doped lanthanum chromite.

The M-doped lanthanum chromite powder may be formed into powder compacts or components by any suitable method such as uniaxial pressing, cold isostatic pressing, slip-casting or die pressing, and sintered in inert or reducing atmospheres in the temperature range of 1600 to 1700° C. to obtain dense lanthanum chromite with density higher than about 95% of theoretical density.

Advantageously, the present invention permits the preparation of a fine hydroxide gel by coprecipitation techniques from salt solutions of lanthanum and chromium, which are taken in the required stoichiometry, with ammonia. The resultant hydroxide gel is washed with deionized water/alcohol to remove the anions while the pH is maintained alkaline. To the washed slurry of the hydroxide gel is then added a solution of a divalent metal salt, such as magnesium nitrate, which does not precipitate at the high pH required for lanthanum and chromium precipitation.

The slurry is then subjected to a supercritical solid/liquid separation in a batch or, preferably, continuous process of the type disclosed in U.S. Pat. No. 4,845,056. The supercritical powder/liquid separation ensures that the dissolved divalent metal dopant is uniformly and quantitatively distributed on the lanthanum chromite precursor and, therefore, eliminates possible losses of divalent metal during washing. In addition, the separation of the powder from the liquid under supercritical conditions eliminates the effects of surface tension completely and yields an extremely fine powder. This fine powder upon calcination yields high surface area, submicron grain crystalline powders which sinter to near full density at temperatures as low as 1600° C.

Thus, the present invention affords significant advantages over conventional procedures by providing for excellent composition control of doped lanthanum chromite powders and formation of very fine chromite powder via supercritical separation of the solid particles from the liquid. Surprisingly, the lanthanum chromite powder sinters to better than 95% of theoretical density at a lower temperature than the temperatures employed by conventional processes.

BRIEF DESCRIPTION OF THE DRAWINGS

The invention will be more fully understood and further advantages will become apparent when reference is made to the following detailed description and the accompanying drawings in which.

DETAILED DESCRIPTION OF THE INVENTION

Figure 1:
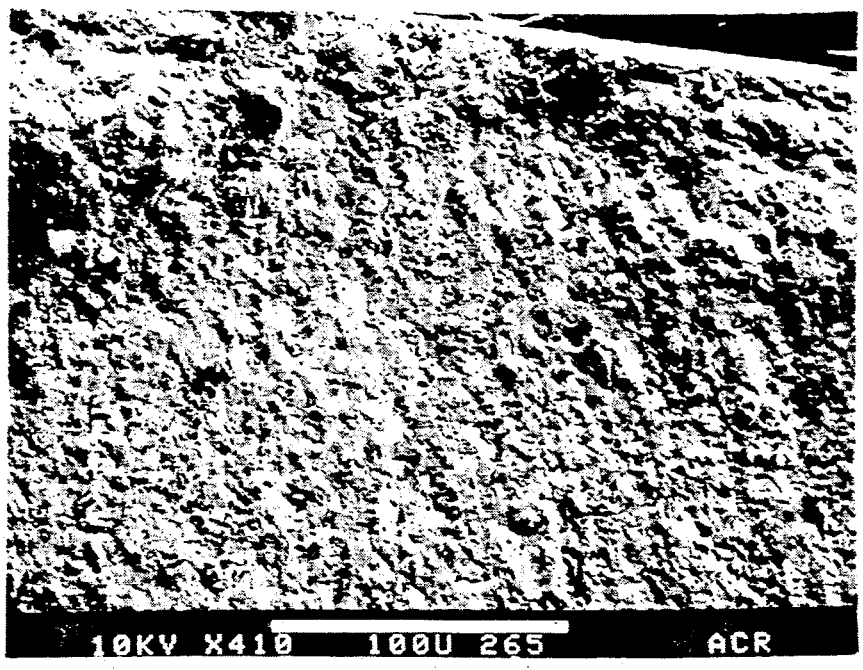
FIG. 1 is a SEM photomicrograph of a fracture surface of lanthanum chromite disk prepared in accordance with the present invention.

Set forth hereinafter in more detail is a description of the elements to which the present invention relates, namely, the lanthanum chromite precursor, the process for preparing this precursor, the sinter-reactive lanthanum chromite, and the process for preparing the sinter-reactive lanthanum chromite.

The lanthanum chromite precursor powder is amorphous or microcrystalline and has the empirical formula $LaCr_{1-x}M_xO_3$ (Adsorbate), where M is a divalent metal such as magnesium or calcium, x ranges from 0.03 to 0.3, and Adsorbate is volatile matter which is adsorbed on the powder. The composition of the adsorbate consists essentially of water, alcohols and other organic adducts. The amount of the adsorbate present may range up to about 35 weight percent of the total as-produced lanthanum chromite precursor.

The lanthanum chromite precursor is prepared by reacting a solution of lanthanum and chromium with a solution of ammonium hydroxide. It is necessary that the atomic ratio of lanthanum and chromium in the solution be the same as that of the precursor compound, that is, $1:1-x$. The liquid used to make the solutions may be water, organic solvents or their mixture, with water being the preferred solvent. Any compounds of lanthanum and chromium may be used to make the solutions provided these compounds have sufficient solubility in the chosen solvent.

When the desired solvent is water, the compounds of lanthanum and chromium used to make the solutions may be, but are not limited to, chloride, nitrate, acetate, etc., salts. These salts include but are not limited to lanthanum chloride, lanthanum bromide, lanthanum nitrate, lanthanum acetate, chromium chloride, chromium bromide, chromium nitrate, chromium acetate. It is not necessary that the salts used in the preparation of the solution have a common anion.

An intermediate insoluble hydroxide with lanthanum and chromium in atomic ratio corresponding to that of the precursor or final lanthanum chromite, that is, ratio of $1:1-x$ is coprecipitated by mixing a solution of the desired compounds with a solution containing a stoichiometric excess of ammonium hydroxide. Precipitation of these metals at pH of 9 to 10 is essentially quantitative. The solution containing the metal salts is added to the solution of ammonium hydroxide under vigorous stirring or vice versa. However, addition of the metal salt solution to the hydroxide solution is the preferred method of mixing the solutions for coprecipitation. The metal salts may be dissolved in one solution or in separate solutions. In the case of separate metal solutions, the solutions should be added simultaneously, at the same location and the molar feed rates of the metals should correspond to the atomic ratio of the metals in the precursor and final lanthanum chromite.

The insoluble hydroxide intermediate, i.e. the coprecipitate formed from mixing the lanthanum and chromium solution with the ammonium hydroxide solution according to the method of the present invention contains the lanthanum and chromium metals in the same atomic ratio as the final lanthanum chromite. This coprecipitate is voluminous, may be gelatinous, and, at high metal concentration, may turn into a rigid gel. However, it is preferred that the metal concentration be controlled at such levels that the precipitate forms a dispersion of high fluidity and this dispersion will be referred to as gel. In this context, the word gel is meant to denote a dispersion or slurry of precipitated or coprecipitated particles, which are aggregates of nanometer-size particles, in a liquid phase. The solids concentration and the viscosity of this dispersion are such that the gel flows relatively easily, is fairly stable, and can be pumped by any conventional slurry pump, such as a diaphragm pump.

The gel or slurry obtained from the coprecipitation step is then subjected to washings with deionized (DI) water or DI water/alcohol mixtures to remove the anions, that is, chlorides, bromides, nitrates or acetates from the lanthanum and chromium compounds used in the preparation of the hydroxide intermediate. This washing may be performed using batch or continuous processes. In a laboratory-scale batch process, the slurry is diluted with the appropriate wash liquid and stirred, and the precipitate is allowed to settle by gravity. The clear supernatant liquid containing the soluble anions is then decanted, and the wash process is repeated until the anion concentration is sufficiently low. Precipitates from halides, need to be washed thoroughly because residual halides in the final ceramic powder may degrade the powder's sintering behavior or mechanical properties. Thorough washing of nitrate or acetate anions is not necessary because residual amounts of such anions are easily removed during subsequent calcination steps. The composition of the wash liquid is progressively changed from DI water to alcohol in order to have the precipitate dispersed in a water/alcohol mixture with the concentration of water at about 20 w % at the end. Any alcohol may be used but monohydric alcohols with low molecular weight are preferred. Isopropanol, a widely used chemical solvent, is the most preferred alcohol.

To the slurry of the washed hydroxide gel is then added a solution of an M compound where M is a divalent metal such as magnesium or calcium and the compounds may be nitrate, acetate, or other soluble inorganic or organic salts which decompose at temperatures in the range of 200 to 600° C. The quantity of the M compound solution which is used should be such that the atomic ratio of the lanthanum and chromium in the hydroxide precipitate and M in the solution should be the same as the desired composition in the precursor or the final ceramic lanthanum chromite, that is, La:Cr:M should be equal to $1:1-x:x$.

The water/alcohol slurry of the precipitated hydroxide and the dissolved M compound is then subjected to a supercritical separation. In other words, the powder is released from the liquid at temperature and pressure equal to or greater than the critical point of the water/alcohol liquid in a batch or continuous process. Under supercritical conditions the surface tension of the liquid is about zero, the solid particles are released from the liquid phase without compaction and, therefore, the powder is in a highly divided state, i.e., the size of the particles is of the order of one nanometer. The powder which is produced from the supercritical separation is usually amorphous and retains adsorbed water and organic molecules. This powder is the precursor lanthanum chromite with empirical formula $LaCr_{1-x}M_xO_3$ (Adsorbate) where Adsorbate is adsorbed volatile matter consisting of water, alcohols such as isopropanol, and other organic adducts whose composition is not precisely known.

Sinter-reactive lanthanum chromite powder with chemical formula $LaCr_{1-x}M_xO_3$, where M is a divalent metal such as magnesium or calcium and x ranges from about 0.03 to 0.3, is prepared from the lanthanum chromite precursor which is produced according to the present invention as discussed hereandabove. To this end, the lanthanum chromite precursor powder is subjected to calcination in air to release adsorbed water and organic adducts and to crystallize the powder followed by deagglomeration of the calcined powder to reduce its particle size distribution.

In heating up the lanthanum chromite precursor in air the major weight loss of adsorbate usually occurs below about 400° C. with complete burn off at temperatures of about 550° C. Calcination of the powder at about 550° C. in air for 2 hours converts the amorphous powder to a crystalline material which is a mixture of lanthanum chromite, huttonite with chemical formula isostructural to $LaCrO_4$, and small amounts of lanthanum chromium oxide with chemical formula isostructural to $La_2CrO_6$. On the other hand, calcination of the precursor powder at 750° C. in air for 2 hours leads to the formation of perovskite lanthanum chromite with only trace quantities of huttonite and lanthanum chromium oxide which completely disappear during densification. The calcination temperature and time are selected to tailor make the ceramic powder to suit the requirements of specific ceramic green forming processes. Generally, calcination of the lanthanum chromite precursor powder is conducted at a temperature ranging from about 650 to 1100° C. for about 0.5 to 5 hours followed by deagglomeration, yielding sinter-reactive lanthanum chromite powders with composition $LaCr_{1-x}M_xO_3$ where M is magnesium or calcium and x ranges from about 0.03 to 0.3.

Under controlled atmospheres the sinterability of lanthanum chromite powders prepared according to the present invention is much better than the sinterability of powders prepared by other state-of-the-art processes. Densities of at least 95% of theoretical have been obtained at sintering temperatures as low as 1600° C. It is important that an inert atmosphere be used in the sintering step in order to prevent the volatilization of chromium. Examples of inert atmospheres are oxygen-free argon or nitrogen and mixtures of $CO_2/CO$ gases. Powder compacts for sintering can be formed by well known processes such as uniaxial pressing, cold isostatic pressing, extrusion, injection molding, roll pressing, and other ceramic forming techniques.

Based on the aforementioned discussion the process for preparing sinter-reactive lanthanum chromite consists of the process steps for the preparation of the lanthanum chromite precursor and the steps of: air calcination of the precursor powder and deagglomeration of the calcined powder.

In order to more fully describe the advantages to be derived from the present invention, the following examples are set forth. These examples are considered to be illustrative only and are not intended to limit the scope and content of the invention as defined by the subjoined claims.

EXAMPLE 1

A six-gallon polyethylene container was loaded with one (1) gallon of isopropanol (2-propanol) and two (2) liters of concentrated ammonium hydroxide which typically contains 28-30 w% ammonia. This ammonia/water/isopropanol solution is denoted as solution A. In another container a solution of lanthanum nitrate and chromium nitrate was prepared by dissolving 649.5 grams of $La(NO_3)_3.6H_2O$ and 540.0 grams of $Cr(NO_3)_3$ in three (3) gallons of isopropanol. The resultant solution of lanthanum and chromium nitrates is denoted as solution B.

Solution B was added to solution A dropwise under vigorous stirring with a shear mixer rotating at about 1500 revolutions per minute. A voluminous, greenish precipitate of lanthanum/chromium hydroxides formed instantaneously. This precipitate was kept well dispersed by maintaining the pH greater than 9.5 (using excess ammonia) throughout the precipitation step and by the vigorous stirring. The latter also provided for uniform pH conditions and, therefore, instantaneous precipitation of the lanthanum/chromium hydroxides throughout this step.

The lanthanum/chromium hydroxide precipitate or gel was then subjected to several washes with DI water/isopropanol (15 volume percent water) mixtures by batch gravity settling methods to reduce the nitrate concentration to less than about 3 percent of its initial value.

To the washed hydroxide gel were added 36.5 grams of magnesium nitrate hexahydrate $(Mg(NO_3)_3.6H_2O)$ dissolved in one (1) liter of DI water/isopropanol (15 volume percent water). The resultant gel was then subjected to solid/liquid separation using the continuous process described in U.S. Pat. No. 4,845,056 to obtain the lanthanum chromite precursor, $LaCr_{0.9}Mg_{0.1}O_3$ (Adsorbate), powder. This precursor powder was amorphous and in a highly divided state as indicated by its surface area of 150 $m^2/g$.

EXAMPLE 2

A batch of lanthanum chromite precursor was prepared by a procedure identical to that used in Example 1 except that magnesium acetate was used instead of magnesium nitrate. The as-produced precursor powder had a surface area of 180 $m^2/g$.

EXAMPLE 3

The lanthanum chromite precursor powder prepared as described in Example 1 was subjected to calcination at various temperatures. As a result of calcination adsorbed water and organic adducts on the precursor powder were removed or burnt off and the precursor crystallized into magnesium-doped lanthanum chromite. The surface area of the calcined powder is shown in Table 1.

TABLE 1

| Surface Area of Calcined Lanthanum Chromite Powder | | |
|---|---|---|
| Calcination Temperature (°C.) | Surface Area Time (hours) | $(m^2/g)$ |
| None | None | 150 |
| 700 | 3 | 20 |
| 800 | 3 | 12 |
| 900 | 3 | 4 |
| 1050 | 3 | 2 |

These data show that by controlling the calcination time and temperature the particle size distribution of the lanthanum chromite powder can be tailored to suit the requirements of the forming process which is used to make powder compacts for ceramic components.

EXAMPLE 4

Precursor lanthanum chromite prepared according to the method described in Example 1 was calcined at 650° C. in air to yield magnesium-doped lanthanum chromite, $LaCr_{0.9}Mg_{0.1}O_3$, ceramic powder. This powder was wet ball-milled in alcohol, dried and uniaxially pressed into disks. These disks had a green density of about 50% TD and were sintered in a tungsten furnace degassed to $10^{-5}$ mm Hg at 700° C. and then flushed with argon for the remainder of the sintering cycle. The temperature was ramped (8 C/min on heat-up, 3 C/min on cool-down) to 1600° C. and held there for 2 hours. The density of the sintered disk was measured by the Archimedes method and found to be 98.8% of theoretical (TD). To the best of our knowledge, this is the highest density ever achieved in the sintering of magnesium-doped lanthanum chromite powders at this relatively low temperature. It is worth noting that the density of 98.8% TD obtained at 1600° C. with the lanthanum chromite powder prepared according to the present invention is higher than the density of 95.3% TD obtained at 1740 by Groupp and Anderson. This density is also higher than the density of 78% of theoretical achieved at 1600° C. for 2 hours using powder prepared according to the procedures of U.S. Pat. No. 4,830,780.

FIG. 1 shows a photomicrograph of a fracture surface from the 98.8% TD disk obtained with a scanning electron microscope (SEM). This shows the presence of scattered porosity and low density regions (the maximum longest dimension of the latter regions is about 30 $\mu$m) which are similar to what is usually present in sintered ceramic specimens obtained from uniaxially pressed powder compacts.

Figure 2:
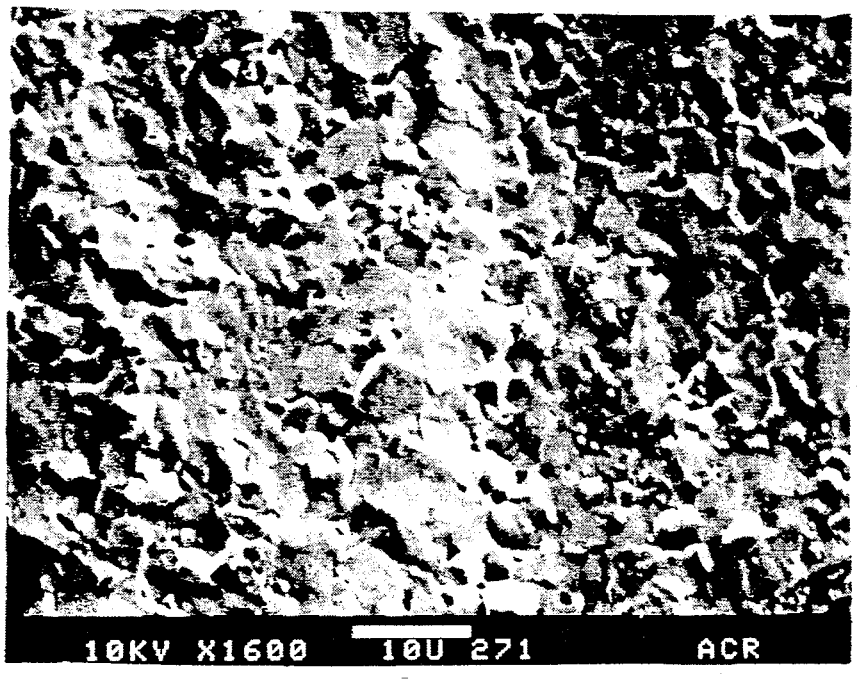
FIG. 2 is a SEM photomicrograph of a fracture surface from a dense region of the lanthanum chromite disk of FIG. 1.
Figure 3:
FIG. 3 is a TEM photomicrograph of the disk of FIG. 1 showing crystalline grain boundaries.

FIG. 2 is an SEM photomicrograph of fracture surface from a dense region. The FIGURE shows that the grains are prismatic and less than 10 $\mu$m in size. Examination of the grain boundaries under a transmission electron microscope (TEM) shows that glassy boundaries and pockets are entirely absent. The TEM micrograph of FIG. 3 shows typical crystalline grain boundaries. Analyses of the grains and grain boundaries by electron dispersive spectroscopy show that both regions have the same chemical composition.

EXAMPLE 5

Sintering of magnesium-doped lanthanum chromite, $LaCr_{0.9}Mg_{0.1}O_3$, powder compacts formed as described in Example 4 was conducted at 1500° C. in the tungsten furnace under argon flow. With a hold of 5 hours at 1500° C. the final density was found to be 83.1% of theoretical by the Archimedes method. Again, this degree of densification is much better than what has ever been achieved in the sintering of magnesium-doped lanthanum chromite powders at this low a temperature.

Having thus described the invention in rather full detail, it will be understood that such detail need not be strictly adhered to but that further changes may suggest themselves to one having ordinary skill in the art, all falling within the scope of the invention as defined by the subjoined claims.

We claim:

1. A process for the preparation of sinter-reactive lanthanum chromite doped with divalent metals and having the formula $LaCr_{1-x}M_xO_3$ where M is the divalent metal and x ranges from about 0.03 to 0.3, comprising the steps of:
   i. preparing a lanthanum chromite precursor powder having the empirical formula $LaCr_{1-x}M_xO_3$ (Adsorbate) where M is magnesium or calcium, x ranges from about 0.03 to 0.3, and the Adsorbate is volatile matter, which is adsorbed on the powder and is present up to about 35 weight % based on total precursor weight, said precursor being prepared by:
      a. reacting a solution containing a lanthanum compound and a chromium compound in an atomic ratio of La:Cr of 1:1-x with a stoichiometric excess of ammonium hydroxide to precipitate an intermediate hydroxide in the form of a slurry;
      b. washing the precipitated intermediate hydroxide with a wash liquid comprising deionized (DI) water and DI water/alcohol mixtures to remove most of the anions from the lanthanum and chromium compounds used in step (a) and to yield a slurry in a water/alcohol liquid;
      c. adding to the hydroxide slurry obtained in step (b) a solution of an M compound taken in such quantity as to yield an atomic ratio of La:Cr:M of 1:1-x:x where M is a divalent metal and is operative as a dopant;
      d. separating the powder from the water/alcohol liquid at supercritical conditions, wherein temperature and pressure are equal to or greater than the critical point of the water/alcohol liquid, in a batch or continuous process to obtain precursor lanthanum chromite powder with empirical formula $LaCr_{1-x}M_xO_3$ (Adsorbate); and
   ii. calcining the lanthanum chromite precursor having the empirical formula $LaCr_{1-x}M_xO_3$ (Adsorbate) at a temperature ranging from about 650 to 1100° C. for a time ranging from about 0.5 to 4 hours followed by deagglomeration to obtain a sinter-reaction ceramic powder having a chemical formula $LaCr_{1-x}M_xO_3$.

2. The process of claim 1 in which said M metal is magnesium.

3. The process of claim 1 in which said M metal is calcium.

4. The process of claim 1 in which said alcohol contains 1 to 5 carbon atoms.

5. The process of claim 1 in which said alcohol is isopropanol.

* * * * *